A. KLOSE.
ENGINE DRIVEN BY INNER COMBUSTION MOTORS.
APPLICATION FILED SEPT. 18, 1908.
949,580.
Patented Feb. 15, 1910.
3 SHEETS—SHEET 1.
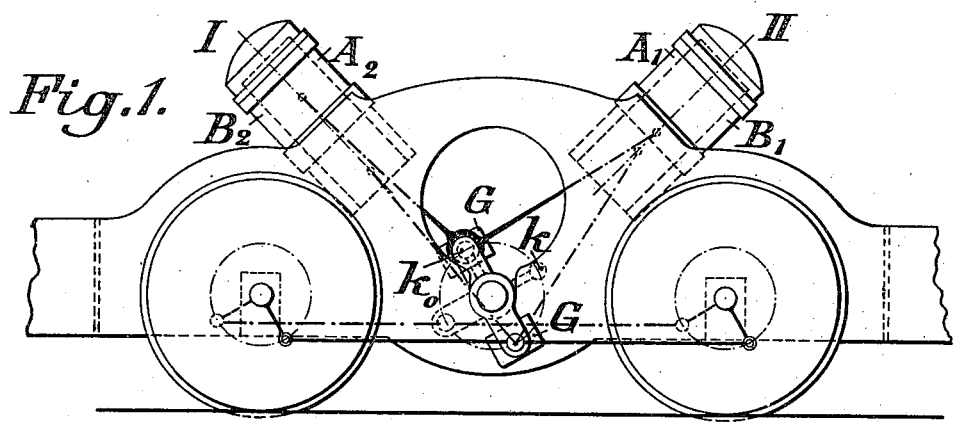
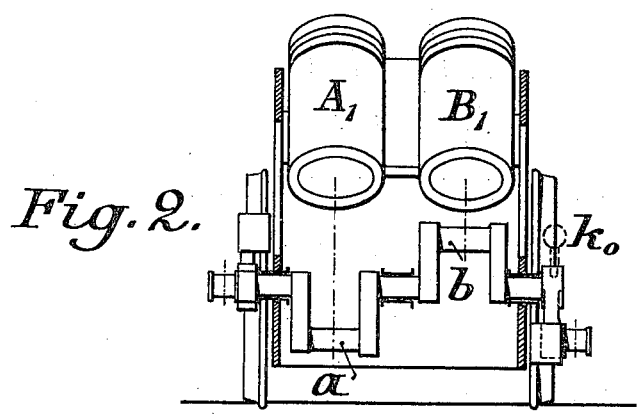
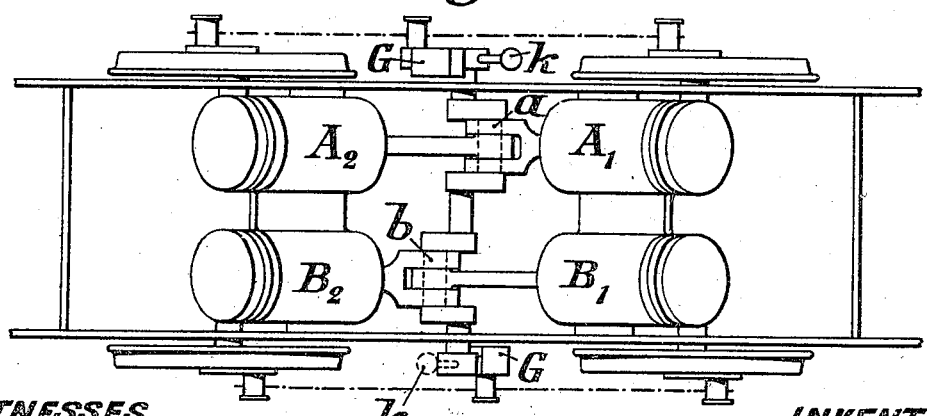
WITNESSES
INVENTOR A. KLOSE.
ENGINE DRIVEN BY INNER COMBUSTION MOTORS.
APPLICATION FILED SEPT. 18, 1908.

949,580.

Patented Feb. 15, 1910.

WITNESSES

INVENTOR

A. KLOSE.
ENGINE DRIVEN BY INNER COMBUSTION MOTORS.
APPLICATION FILED SEPT. 18, 1908.
949,580.
Patented Feb. 15, 1910.
3 SHEETS—SHEET 3.
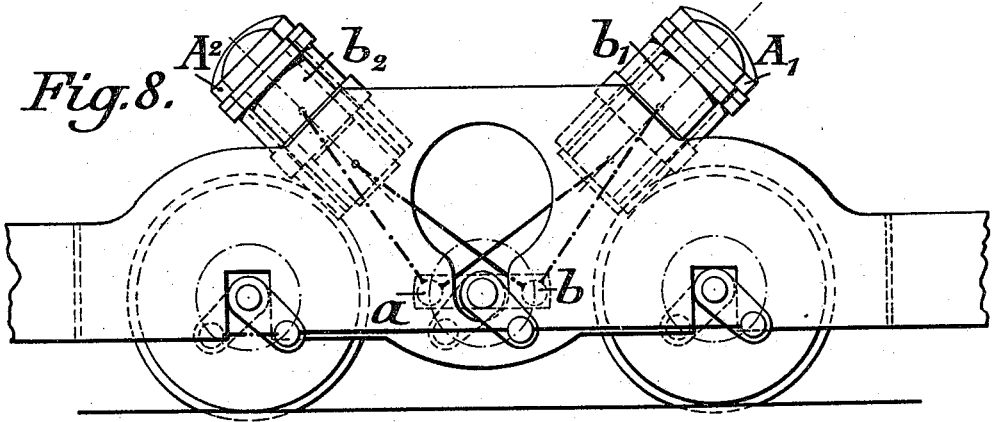
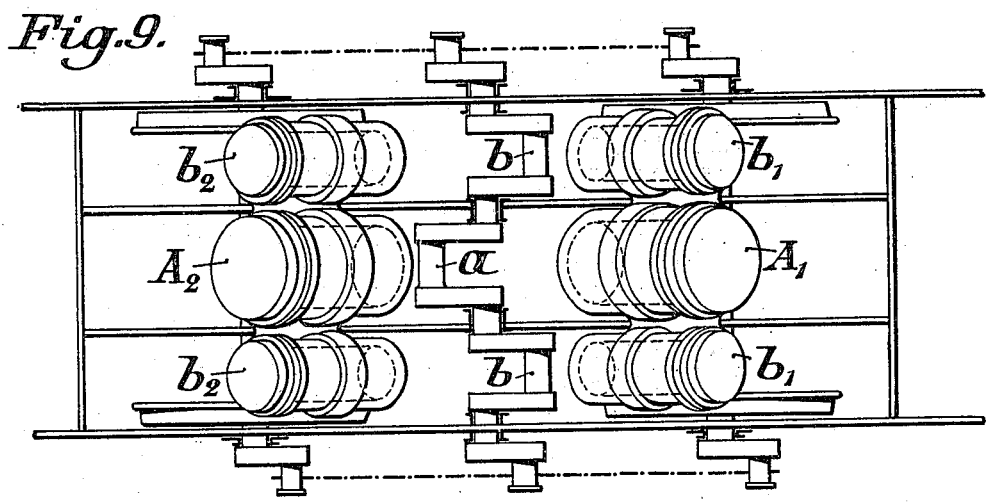
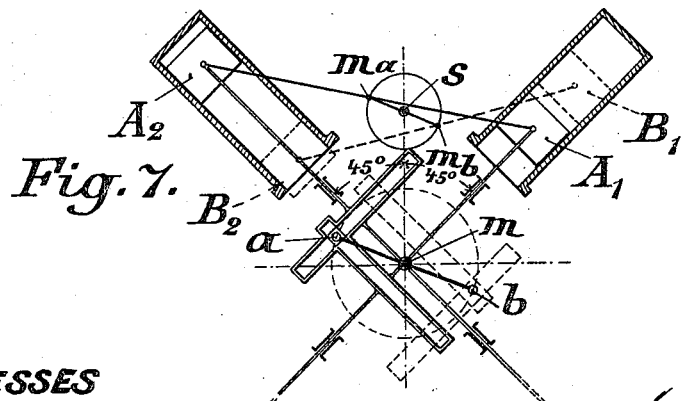
WITNESSES
INVENTOR

UNITED STATES PATENT OFFICE.

ADOLPH KLOSE, OF HALENSEE, NEAR BERLIN, GERMANY.

ENGINE DRIVEN BY INNER-COMBUSTION MOTORS.

949,580.   Specification of Letters Patent.   Patented Feb. 15, 1910.

Application filed September 18, 1908. Serial No. 453,701.

*To all whom it may concern:*

Be it known that I, ADOLPH KLOSE, engineer, a subject of the German Emperor, residing at 163 Kurfürstendamm, Halensee, near Berlin, Germany, have invented certain new and useful Improvements in or Relating to Engines Driven by Means of Inner-Combustion Motors; and I do hereby declare the following to be a full, clear, and exact description of the invention, such as will enable others skilled in the art to which it appertains to make and use the same.

This invention relates to locomotives driven by internal combustion engines.

The arrangements hereinafter described are for the purpose of transmitting the power to the driving wheels of the locomotive in such manner as to prevent the forces due to the reciprocatory movement of the parts of the motors from having any effect in the vertical direction on the spring-supported frame of the locomotive, and also to obviate the occurrence of any torsional couples in the horizontal plane which might cause a rolling or irregular motion of the locomotive, even the couples due to the limited lengths of the connecting rods being eliminated.

Figure 4:
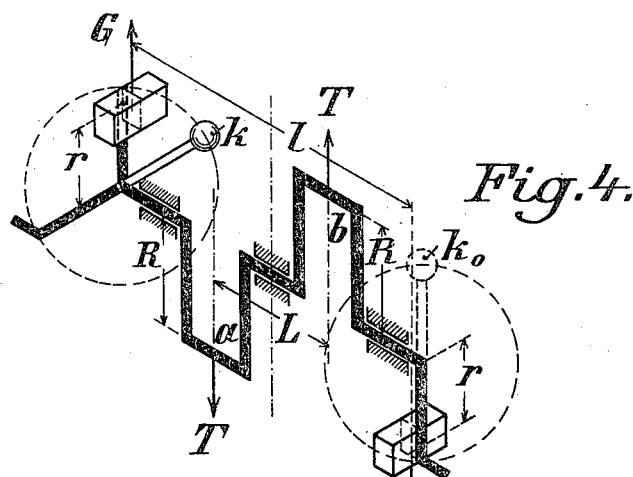
Figure 5:
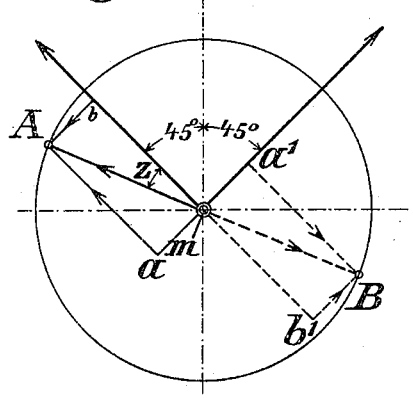
Figure 6:
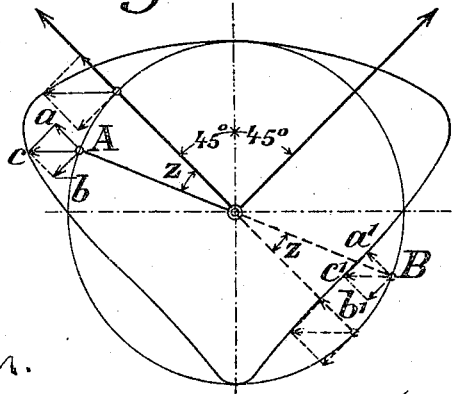

Figures 1, 2 and 3 show the arrangement of cylinders and driving gear on a locomotive, Fig. 1 being an elevation, Fig. 2 an end view, and Fig. 3 a plan of part of the engine. Fig. 4 is a diagrammatic perspective view of the main driving shaft showing the relative position of cranks and counter-weights, Figs. 5, 6 and 7 are diagrams explanatory of the effect of the moving masses, Figs. 8 and 9 show an arrangement with a larger number of cylinders and wheels placed inside the frame.

The driving wheels of the locomotive are driven in a well known manner through coupling rods by a common transverse crank shaft which together with the cylinders is mounted in the frame carried on springs by the wheels. To the cranks of the transverse shaft are connected crank driving motors the cylinder axes of which are arranged longitudinally of the frame at angles of 45° to the horizontal plane, and are at equal distances from the vertical longitudinal middle plane of the locomotive.

Each pair of the motors drives one crank of the transverse shaft; the directions in which the power of such a couple is exerted are therefore at right angles to each other. Moreover, all the motors have cranks and rods of substantially the same length and the weight of moving masses of the motors distributed on both sides of the longitudinal middle plane, is the same.

The described arrangement completely fulfils the aforesaid purpose and it only remains to be stated that the pairs of cylinders are designated by A, $A^2$ and B', $B^2$, the cranks by $a$ and $b$. G, G are the rotating counterweights, $k$, $k^0$ are counterweights for balancing the outer crank pins and the coupling rods. The cranks $a$ and $b$ are arranged at an angle of 180°.

The working cylinders may as usual be provided with devices for controlling the speed and reversing the direction of rotation, which devices may preferably be operated from the foot-plate.

It will now be shown that by the described arrangement the reciprocating masses are completely balanced and that the mass forces (commonly called of the second order) due to the limited lengths of the connecting rods, are so directed that they have no effect on the yieldingly supported frame and do not act in a direction normal to the plane of the rails.

Assuming first the connecting rods to be of infinite length, it may be seen from Fig. 7 that the common center of gravity $m^a$ of the masses of the driving pair A', $A^2$ moves exactly as much to the one side away from the vertical plane through the crank shaft as the center of gravity $m^b$ of the pair B', $B^2$ moves to the other side. The resultant center of gravity remains therefore at S and there are no free or unbalanced mass forces. The center of gravity $m^a$ of the pair A', $A^2$ and the center of gravity $m^b$ of the pair B' $B^2$ move in a circle at 180° to each other around the center S.

Fig. 5 illustrates the action of the forces due to the moving masses under the assumption that the connecting rods are of infinite length.

The acceleration of the reciprocating masses of a crank and connecting rod mechanism is given by the formula:

$$p = \frac{v^2}{r}\left(\cos z \pm \frac{r}{l} \cos 2z\right)$$

wherein $v$ is the velocity of the crank pin, $r$ the length of the crank, $l$ the length of the connecting rod and $z$ the variable angle between the crank and the line in which the cross-head moves. If $\frac{r}{l}$ be *nil*, *i. e.* the length of the rod very great, $$p = \frac{v^2}{r} \cos z,$$

*i. e.* directly proportional to the cosine of the crank handle.

If according to Fig. 5 one pair of motors acts on the crank A and the other pair on the diametrically opposite crank B, the acceleration force of the one motor couple may be represented by the vector $a$ A and that of the other by the vector $b$ A, the resultant being $m$ A; so also the couple acting on the opposite crank B is represented by $a'$ B and $b'$ B the resultant of which is $m$ B. The two resultants are of the same magnitude but opposite directions and therefore completely balance each other. As regards the forces due to the limited lengths of the connecting rods, or the mass forces of the second order, these are given by the formula $$p = \frac{v^2}{r} \frac{l}{r} \cos 2z,$$

and are therefore proportional to the cosine of the double crank angle. These forces have during each revolution at four times the same magnitude, but alter twice their signs or directions, and are at four times equal to zero.

In Fig. 6 A $a$ and A $b$ represent such additional free mass forces exerted by the motor couple on the crank A, while B $a'$ and B $b'$ are the mass forces acting on the diametrically opposite crank B. The two forces acting on crank A may be compounded into the resultant A $c$ and the forces on crank B into the resultant B $c'$. Both resultants act at an angle of 45° to the axes of the respective cylinders and are therefore parallel to the plane of the rails. They always have the same directions, and alter their magnitudes and signs in the same manner and at the same time. These additional mass forces of the second order due to the limited length of the connecting rods, act therefore always in the direction of the rails, are parallel to the plane of the rails and have no effect on the springs supporting the frame or on the rails. These forces never form a torsional couple, although they act in different planes, *i. e.* in the planes of the motors or their mean crank circle, and at a distance from the longitudinal middle plane of the locomotive. Owing to the fact that the distances of the motors from the said middle plane are equal, the resultant of the secondary forces acts in the middle plane of the locomotive, and there are no torsional couples tending to turn or oscillate the locomotive on a vertical axis extending through its center of gravity.

These forces of the second order act therefore, alternating in direction and magnitude within limits, only at the middle point of the transverse axis and the direction of travel, that is, parallel to the plane of the rails.

It will now be explained in what manner the mass forces of the first order, which as mentioned above counteract each other as regards the magnitude and direction, operate on the locomotive in view of the fact that these forces occur in different planes at a lateral distance from the longitudinal middle plane. This action will be best understood by the aid of Fig. 4 showing diagrammatically the arrangement of the driving shaft. On the cranks $a$ and $b$ act the motors A' A² and B' B² respectively. The cranks $a$ and $b$ are diametrically opposite to each other. There now occur in the plane of revolution of the crank, mass forces of the so-called first order acting on the shaft as well as those of the second order due to the limited length of the connecting rods.

The mass forces of the first order have been considered in connection with Fig. 5 and are of the same magnitude but opposite directions. They would therefore have no effect on the shaft but for the fact that they act in different planes. As a matter of fact these forces act however radially outward with constant strength at a distance L equal to the distance between the two crank circles. They form, therefore, a couple L. T of constant moment if the mass of a driving gear be assumed to be T. Each couple may be counterbalanced by another couple acting in the opposite sense and of equal moment. It is sufficient for this purpose to provide counter-weights G, G the distance $l$ of which from the axis is determined by the formula:

$$T R L = G r l.$$

The resultant of all forces will then act in the longitudinal middle plane of the locomotive and there will be a complete balance of the forces, acting on the locomotive. It remains to be mentioned that the cranks outside the frame to which the coupling rods of the wheels are connected are arranged at right angles to each other and are counterbalanced by separate weights $k$ and $ko$.

If the arrangement shown in Figs. 8 and 9 be used the counterweights may be dispensed with and it is clear that there will be no couples tending to turn the frame on a vertical axis.

In the foregoing description it was assumed that there is one working impulse in each cylinder for each revolution of the shaft. If the cylinders work on the four-stroke cycle there must be on each side of the longitudinal middle plane two pairs of oppositely working pistons placed symmetrically with regard to that plane.

Having thus described the nature of my invention and the best means I know of carrying the same into practical effect, I claim:

1. In a locomotive driven by internal combustion engines, the combination of a transverse shaft, and working cylinders arranged at an angle of 45° to the plane of the rails and acting in pairs on said transverse shaft, the axes of said pairs being parallel and symmetrical to the middle longitudinal plane of the locomotive, and the cylinders of each pair acting on the transverse shaft at opposite sides thereof, substantially as described.

2. In a locomotive driven by internal combustion engines, a wheeled frame, a transverse shaft journaled therein, and coupled with the wheels, working cylinders at opposite sides of said shaft disposed symmetrically on both sides of the middle longitudinal plane of the locomotive and at an angle of 45° to the plane of the rails, and cranks and connecting rods connecting the pistons of the cylinders with said shaft, substantially as described.

3. In a locomotive driven by internal combustion engines, the combination of a wheeled frame, a transverse shaft journaled therein and coupled with the driving wheels, cranks on said shaft disposed at 180° to each other, and working cylinders acting on said cranks at opposite sides of said shaft and arranged in pairs disposed symmetrically to the longitudinal middle plane of the locomotive, each cylinder being disposed at an angle of 45° to the plane of the rails and connected with the same crank of said transverse shaft as the opposite cylinder of the same pair, substantially as described.

4. In a locomotive driven by internal combustion engines, the combination with a transverse shaft coupled to the driving wheels and provided with oppositely arranged equal cranks disposed symmetrically with regard to the middle plane of the engine, of working cylinders arranged in pairs working each on a crank of the said shaft, the cylinders being inclined at an angle of 45° to the plane of the rails, and suitable counterweights for eliminating torsional couples tending to turn the locomotive on a vertical axis, substantially as described.

5. In a locomotive driven by internal combustion engines, the combination of a transverse shaft coupled to the driving wheels and provided with three cranks, one disposed in the middle plane of the engine and the other two arranged at equal distances from the first, the two outer cranks being arranged at angles of 180° to the inner crank, and three pairs of working cylinders acting by means of connecting rods on the said cranks the cylinders being disposed at angles of 45° to the plane of the rails, substantially as described.

6. In a locomotive driven by internal combustion engines, the combination of a transverse shaft coupled to the driving wheels and provided with three cranks one disposed in the middle plane of the engine and the other two arranged at equal distances from the first, the two outer cranks being arranged at angles of 180° to the inner crank, and three pairs of working cylinders acting by means of connecting rods on the said cranks, all the cylinders being disposed at angles of 45° to the plane of the rails and the ratio of the length of the crank to the length of the connecting rod being equal for all the three cranks, substantially as described.

In testimony whereof I have affixed my signature, in presence of two witnesses.

ADOLPH KLOSE.

Witnesses:
WOLDEMAR HAUPT,
HENRY HASPER.